(12) United States Patent
Wojtas

(10) Patent No.: US 10,871,414 B2
(45) Date of Patent: Dec. 22, 2020

(54) MEMS DEPOSITION TRAP FOR VACUUM TRANSDUCER PROTECTION

(71) Applicant: microGauge AG, Zürich (CH)

(72) Inventor: Nina Wojtas, Zürich (CH)

(73) Assignee: MICROGAUGE AG, Zürich (CH)

( * ) Notice: Subject to any disclaimer, the term of this patent is extended or adjusted under 35 U.S.C. 154(b) by 16 days.

(21) Appl. No.: 15/739,517

(22) PCT Filed: Jun. 24, 2016

(86) PCT No.: PCT/EP2016/064750
§ 371 (c)(1),
(2) Date: Dec. 22, 2017

(87) PCT Pub. No.: WO2016/207401
PCT Pub. Date: Dec. 29, 2016

(65) Prior Publication Data
US 2018/0180503 A1    Jun. 28, 2018

(30) Foreign Application Priority Data

Jun. 26, 2015    (EP) .................................... 15174068

(51) Int. Cl.
*G01L 19/06* (2006.01)
*G01L 21/00* (2006.01)
*G01L 27/00* (2006.01)

(52) U.S. Cl.
CPC .......... *G01L 19/0636* (2013.01); *G01L 21/00* (2013.01); *G01L 27/005* (2013.01)

(58) Field of Classification Search
CPC .............. G01L 19/0636; G01L 27/005; G01N 2001/2223; B01D 45/04; B01D 45/08; B01D 45/00

USPC .............. 73/1.58, 28.05, 28.06, 863.22, 706; 55/474, 521; 96/267, 268, 272

See application file for complete search history.

(56) References Cited

U.S. PATENT DOCUMENTS

| | | | |
|---|---|---|---|
| 3,700,111 A * | 10/1972 | Bode ...................... | B01D 29/46 210/322 |
| 5,811,685 A | 9/1998 | Grudzien, Jr. | |
| 6,443,015 B1 | 9/2002 | Poulin et al. | |
| 6,679,055 B1 * | 1/2004 | Ellis ...................... | B81B 3/0035 310/306 |
| 6,875,247 B2 * | 4/2005 | TeGrotenhuis ......... | B01B 1/005 165/60 |

(Continued)

FOREIGN PATENT DOCUMENTS

WO    2013003789 A1    1/2013

*Primary Examiner* — Robert R Raevis
(74) *Attorney, Agent, or Firm* — Murphy, Bilak & Homiller, PLLC

(57) ABSTRACT

The present invention relates to a MEMS deposition trap (10) comprising: a manifold layer having manifold inlet channels and manifold outlet channels, a microchannel layer (20) having microchannels (33), wherein the manifold layer and the microchannel layer are bonded together so as to form a fluid path, wherein a fluid is forced to pass through the microchannels (33) when flowing from the manifold inlet channels to the manifold outlet channels. Furthermore, it relates to a vacuum sensor having such a deposition trap as and to a process chamber of a manufacturing equipment, preferably used for thin-film deposition or etching processes, comprising such a vacuum sensor.

13 Claims, 13 Drawing Sheets

(56) References Cited

U.S. PATENT DOCUMENTS

| | | | |
|---|---|---|---|
| 6,901,808 B1 | 6/2005 | Sharpless et al. | |
| 7,443,169 B2 | 10/2008 | Björkman et al. | |
| 2003/0167852 A1 | 9/2003 | Traverso | |
| 2006/0261032 A1* | 11/2006 | Krishnamoorthy | G02B 26/0833 216/2 |
| 2007/0120568 A1 | 5/2007 | Bjorkman et al. | |
| 2009/0108193 A1* | 4/2009 | Kostiainen | H01J 49/0018 250/282 |
| 2012/0065551 A1* | 3/2012 | Aviad | A61B 18/203 601/2 |
| 2014/0091405 A1 | 4/2014 | Weber | |
| 2014/0252505 A1 | 9/2014 | Kobayashi et al. | |
| 2014/0264900 A1* | 9/2014 | Feyh | H01L 21/02601 257/773 |
| 2014/0318656 A1 | 10/2014 | Gu et al. | |

* cited by examiner

MEMS DEPOSITION TRAP FOR VACUUM TRANSDUCER PROTECTION

FIELD OF THE INVENTION

The present invention relates to a smart micro deposition trap for the protection of sensors in vacuum process equipment and the specific approach to build such a device structure. In particular, the deposition trap is providing means to protect sensing devices used in vacuum manufacturing equipment from contamination, which results in signal drift and sensor failure. For example, the trap can be used for, but not limited to applications in thin-film, semiconductor, photovoltaic, LED and OLED manufacturing processes like evaporation, PVD, IPVD, CVD, LPCVD, PECVD, ALD, MBE as well as etching processes like RIE, DRIE, IM.

BACKGROUND OF THE INVENTION

Pressure measurement applications in the vacuum range, where the pressure is a critical process parameter, mainly involve the monitoring and control of manufacturing equipment, e.g. in semiconductor fabrication, thin-film deposition or plasma processes. During the vacuum processes, potential contaminants for the sensing devices are often generated in large quantities. A fast and accurate measurement of the process pressure would require locating the sensor as close as possible to the processed substrate. However, this drastically increases the risk of a contaminating the sensor transducer.

A deposition of contaminants on the vacuum pressure transducer or etching of the vacuum pressure transducer results in signal drift, since the deposited or removed material influences the transducer properties. These effects can affect the absolute zero (zero measurand output (ZMO)) of the gauge as well as the pressure sensitivity. Both will impact the process repeatability and long term stability.

It is therefore desirable to install a deposition trap located between the fluid inlet of the pressure sensor, and the vacuum pressure transducer. The deposition trap helps preventing particles or radicals from contaminating or etching the sensor transducer, respectively. Existing methods either use simple screens or screen patterns (US 2014/0091405 A1) for mechanical particle filtering, are based on the principle of extending the flow path before the pressure transducer (U.S. Pat. No. 6,443,015 B1) or introducing direction changes inside the flow path (U.S. Pat. No. 7,443,169 B2) in order to increase the probability of contaminant deposition, or make use of cold traps to remove condensable vapor from process gases (U.S. Pat. No. 6,901,808 B1).

An important challenge is the limitation of the impact of traps, shields or baffles on the response time of the vacuum pressure transducer. The vacuum processes of interest cover pressure ranges of 10 mbar and below. For this pressure range the mean free path of molecules and volatile contaminants is in the range of micrometers and above. For effectively trapping contaminants, either very long fluid flow paths or sub-micron feature sizes are necessary. However, extended flow paths, especially when featuring small dimensions, introduce an additional flow resistance between the process chamber and the transducer and thus lead to a delay of the measured pressure signal.

It is therefore desirable to further improve the efficiency of deposition traps with a short and effective flow path that assures a fast response time of vacuum pressure transducers.

SUMMARY OF THE INVENTION AND ADVANTAGES

The purpose of the present invention is to overcome the limitations of state-of-the-art shields, baffles or traps for the protection of sensors in vacuum process equipment. The disclosed deposition trap effectively removes potential contaminants generated in a vacuum process chamber of e.g. a manufacturing equipment as mentioned above with a significantly reduced impact on the response time of vacuum pressure transducer.

To overcome the above limitations a MEMS (micro electromechanical system) deposition trap is provided, comprising:
a manifold layer having manifold inlet channels and manifold outlet channels, a microchannel layer having microchannels, wherein the manifold layer and the microchannel layer are bonded together so as to form a fluid path, wherein a fluid is forced to pass through the microchannels when flowing from the manifold inlet channels to the manifold outlet channels.

By such an arrangement, the manifold channels route the fluid flow through the microchannels, while assuring a short path inside the latter ones, having the purpose to limit the flow resistance across the deposition trap. Further, the application of the manifold channels allows for a parallel flow path inside the microchannels, where the fluid is homogeneously distributed. Both features result in a small pressure loss across the MEMS deposition trap and thus in a reduced signal delay when the deposition trap is part of an optional vacuum sensor. The stacked layer arrangement of the manifold channels and microchannels introduces multiple direction changes in the flow path. This increases the number of contaminant-boundary interactions and thus greatly improves the contaminant trapping despite of the short fluid path.

It is further proposed that the manifold layer may be interposed between two microchannel layers. As an alternative, a plurality of manifold layers and a plurality of microchannel layers may be stacked alternately. Such multi-layer systems introduce additional parallel flow paths and allow to further decrease the flow resistance.

Preferably, a manifold inlet channel is formed by two inlet side walls and an inlet end wall connecting the inlet side walls, the inlet side walls being arranged to form an opening at an inlet side of the deposition trap.

Further, it is preferred, that a manifold outlet channel is formed by two outlet side walls and an outlet end wall connecting the outlet side walls, the outlet side walls being arranged to form an opening at an outlet side of the deposition trap.

In order to provide a steady flow out of the deposition trap, it is proposed that the outlet channels are connected to at least one collecting outlet opening. In an embodiment the collecting outlet opening may be centrally arranged within the trap. Furthermore, it is possible to arrange a centrally arranged first outlet opening and at least one further outlet opening being concentrically arranged with the first outlet opening. This leads to an arrangement having a first outlet opening in form of a circle and at least one further outlet opening in form of a ring. According to another embodiment, it is possible to provide a plurality of substantially linear outlet openings that are arranged parallel to each other. This leads to an arrangement having two or more outlet openings in form of an elongated rectangle being arranged in a distance from each other. It is understood that a similar effect can be achieved with a concentric or lateral arrangement of any type of shape (e.g. honey-comb structure).

For optimized deposition of contaminants and particles within the deposition trap, it is preferred that the manifold inlet channels, the manifold outlet channels, and the microchannels are formed such that the fluid is forced to change the flow direction when propagating from the inlet to the outlet of the trap. In this respect it may be thought of an arrangement of the microchannels and manifold channels that provides for at least two changes of the flow direction after entering along a first direction into a manifold inlet channel.

In order to be able to provide a simple closed structure of the deposition trap, the manifold layer and/or the microchannel layer are formed as a respective substrate, wherein the respective substrate has a base connected to the manifold channels and the microchannels, respectively. In such a configuration the substrate base of a manifold channel substrate and of a microchannel substrate may act as a sort of bottom or top surface of the manifold channels and the microchannels, respectively. When bonding the microchannel layer and the manifold layer together, the according substrate bases may form a top surface and bottom surface of the deposition trap.

For providing an option to connect the deposition trap with according vacuum equipment, it is desirable that the deposition trap further comprises a support substrate which is adapted to be connected with an associated part of a vacuum sensor.

It may be envisaged that an electrostatic trap is mounted to the support substrate. This may lead to an even improved retraction of particles within the trap. The electrostatic trap comprises a comb electrode array where an electric field can be applied and thus charged contaminants may be removed effectively.

It is possible that the manifold layer and the microchannel layer are manufactured by silicon bulk micromachining technology.

Alternatively, it is also possible that the manifold layer and the microchannel layer are manufactured by low temperature co-fired ceramic (LTCC) technology.

Accordingly, the multiple layer channel structure can be manufactured by means of stacking of bulk micromachined silicon substrates, or low temperature co-fired ceramic (LTCC) technology. Compared to prior art, the miniaturized deposition trap enables a cost effective manufacturing as well as a drastic saving of mounting space.

In order to provide the possibility to remove condensable vapor, the deposition trap may further comprise a Peltier cooling element.

According to another aspect, there is provided a vacuum sensor comprising an inlet port and a vacuum pressure transducer, and a deposition trap having at least one of the above described features and being arranged between the inlet port and the vacuum pressure transducer. The vacuum pressure transducer is exposed to the fluid to be measured through the inlet port.

The deposition trap can be integrated into the vacuum sensor in different ways by mounting it on a support substrate having a feed-through corresponding to the collecting outlet openings (feed-throughs) of the manifold substrate. For instance, the trap can be integrated to a gasket and centering ring used to attach the vacuum sensor to a process chamber. Further, the deposition trap can be integrated into a removable cap covering the vacuum pressure transducer.

Finally, the deposition trap can also be directly integrated as package of the vacuum pressure transducer.

Furthermore, another aspect provides a process chamber of a manufacturing equipment, preferably used for thin-film deposition or etching processes, comprising: at least one vacuum producing device, preferably formed as a vacuum pump system, adapted to produce a vacuum in the process chamber; and at least one vacuum sensor as described above, adapted to detect the pressure in the process chamber. It is to be noted that the above mentioned manufacturing processes comprise techniques such as evaporation, PVD, IPVD, CVD, LPCVD, PECVD, ALD, MBE as well as etching processes like RIE, DRIE, IM. Preferably, the vacuum pump system and the vacuum sensor are directly connected to the process chamber, usually at different locations of a chamber housing.

A further advantage of the MEMS deposition trap may be achieved using an option of a combination of different channel dimensions for trapping different particle sizes. This greatly reduces the risk of microchannel clogging by large contaminants. With respect to the channel sizes the following parameters are preferred:

Width of the microchannels about 10 to 500 μm
Height of the microchannel walls about 200 to 500 μm
Ratio: microchannel height/microchannel width≥1
Ratio: microchannel width/microchannel wall width≥1
Width of the manifold inlet/outlet channels about 200 to 1500 μm
Height of the manifold channel walls about 400 to 2000 μm
Ratio: manifold channel width/manifold channel walls width≥1

BRIEF DESCRIPTION OF THE DRAWINGS

A brief description of preferred embodiments of the present invention is given with respect to the included Figures.

DESCRIPTION OF PREFERRED EMBODIMENTS

The following description of a MEMS deposition trap is given exemplarily and in a schematic manner.

Figure 1:
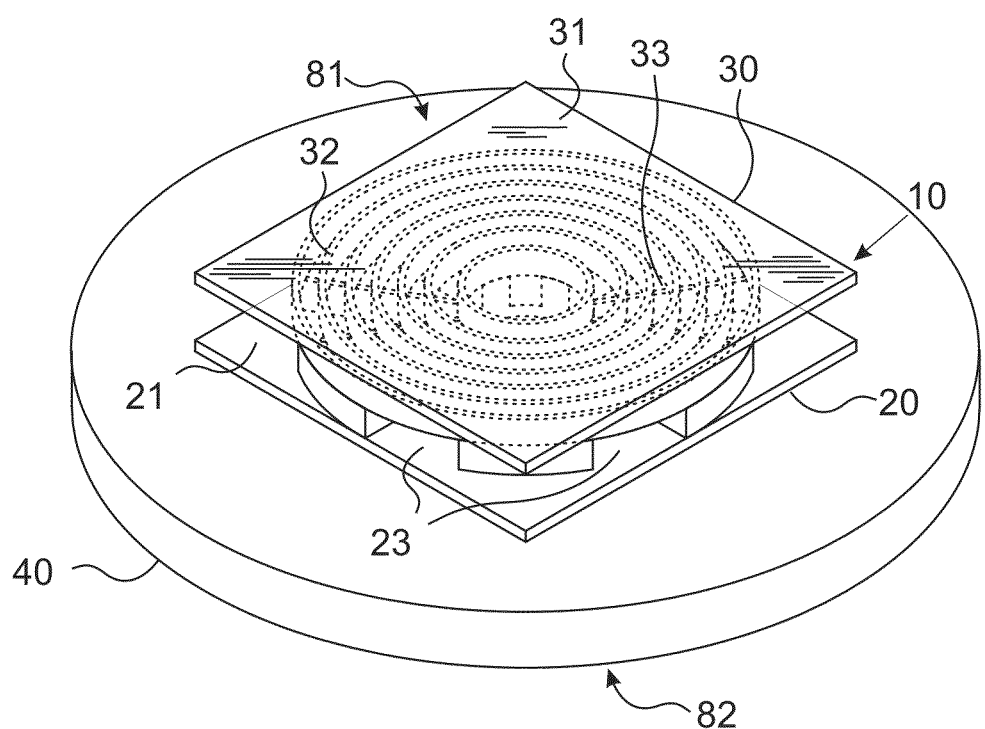
FIG. 1 shows a partly transparent perspective view of an embodiment of a deposition trap allowing an insight to the microchannel structure.

FIG. 1 shows a perspective view of a MEMS deposition trap 10. The MEMS deposition trap 10 comprises a manifold layer 20, preferably in form of a manifold substrate, and a microchannel layer 30, preferably in form of a microchannel substrate, and is mounted onto a support substrate 40. The manifold substrate 20 has a base 21 and a plurality of manifold entrances 23, where a fluid enters the deposition trap 10 from fluid inlet side. The deposition trap 10 is confining the fluid path from the side facing a process chamber 81 (inlet side) to the side facing a vacuum transducer 82 (outlet side) to pass through microchannels 33 which are connected to a microchannel base 31 (the microchannels 33 are visible through the microchannel base 31 being illustrated in a transparent manner in FIG. 1).

Figure 2:
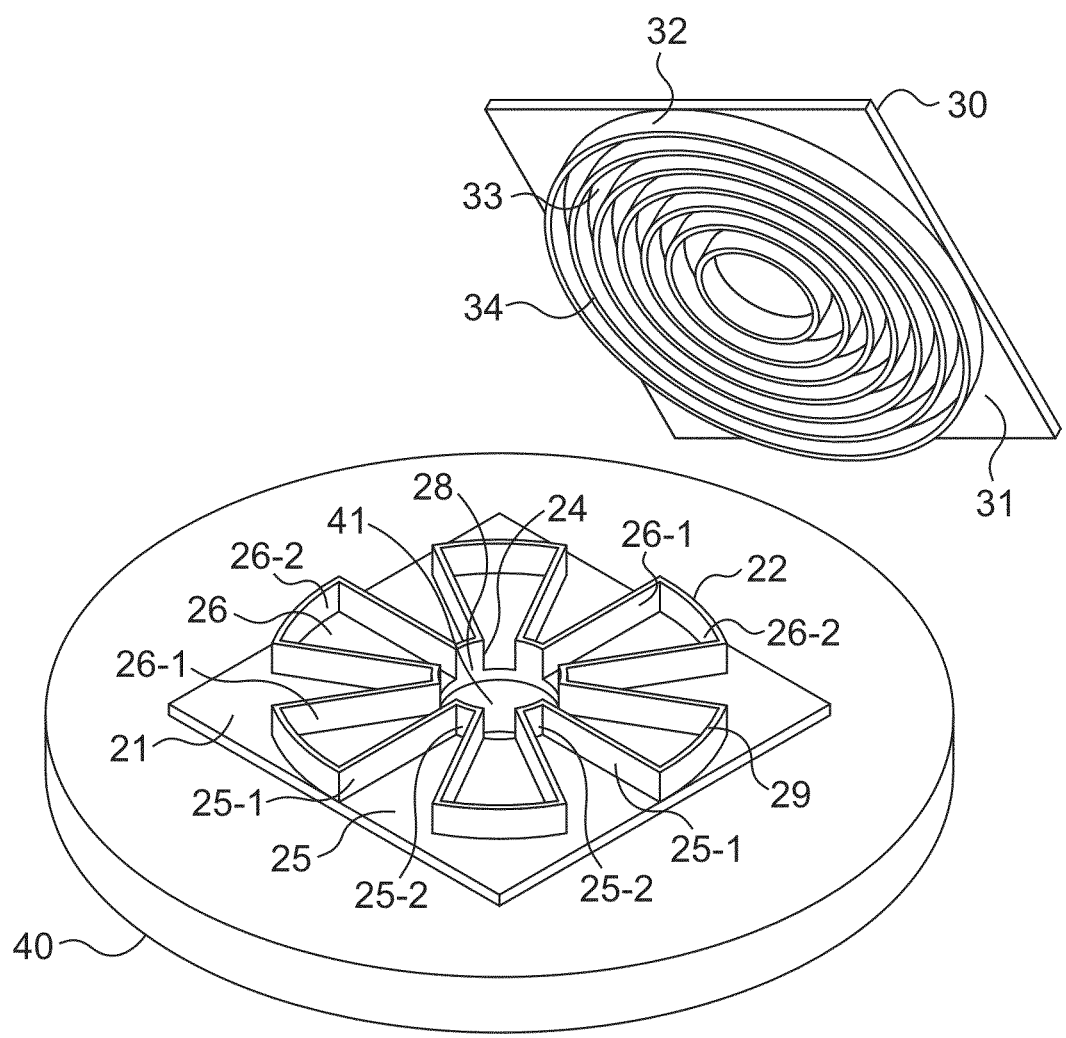
FIG. 2 shows an exploded, perspective view of the deposition trap of FIG. 1.

Referring to the exploded view in FIG. 2, the manifold substrate 20 has a base 21 and manifold channel walls 22 structured in a way as to form a manifold inlet channel 25 and a manifold outlet channel 26. A manifold inlet channel 25 comprises two inlet side walls 25-1 and an inlet end wall 25-2. A manifold outlet channel 26 is formed by two side walls 26-1 and an outlet end wall 26-2. The microchannel substrate 30 comprises a microchannel base 31 and microchannels 33, which are defined on the microchannel base 31 by the microchannel walls 32. The microchannels 33 in this example are arranged in a structured or regular manner, especially by arranging the microchannel walls 32 in form of concentric circles. The support substrate 40 features a support feed-through 41, which is connected to the manifold exits 24 and a manifold feed-through 28. The manifold feed-through 28, preferably together with the support feed-through 41, may be seen as a collecting outlet opening.

Figure 3:
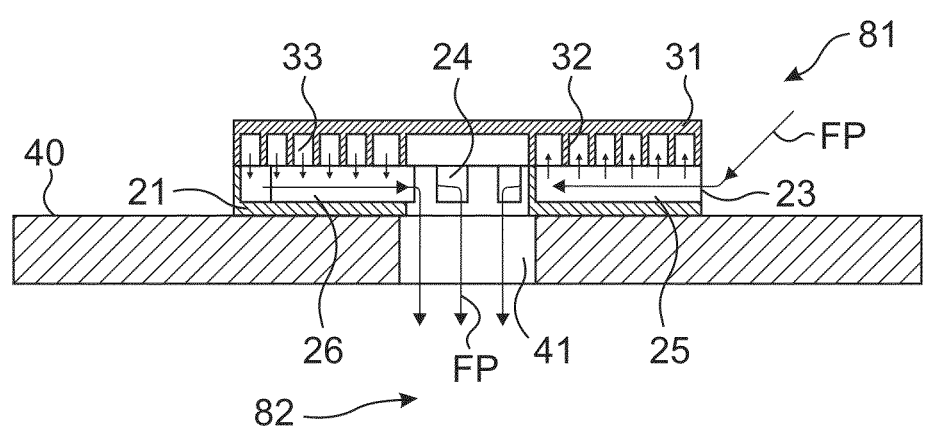
FIG. 3 is a cross-sectional view of the deposition trap of FIG. 1 showing a gas flow path.

The cross-sectional view of FIG. 3 is illustrating the gas flow path from the side facing the process chamber 81 (inlet side) to the side facing the vacuum transducer 82 (outlet side). It has to be noted that the flow can also have the opposite direction to what is illustrated in FIG. 3. A bi-directional flow exists e.g. when the trap is used for the operation of a vacuum sensor/transducer. However, it is not relevant for the protection functionality of the deposition trap, since contaminants to be trapped are entering the trap usually in the indicated flow direction. Thus, in the preferred embodiment of the present invention, the fluid path into the deposition trap 10 is propagating from the manifold entrance 23, through the manifold inlet channel 25 into the microchannels 33. The microchannels 33 allow for further transferring into the manifold outlet channel 26, from where the path is leading to the manifold exit 24, the manifold feed-through 28 and finally the support feed-through 41.

The main purpose of the deposition trap 10 is to remove potential contaminants from the fluid flowing or diffusing from the process chamber side 81 (inlet side) to the transducer side 82 (outlet side) of a vacuum sensor. This is achieved by increasing the probability of contaminant-boundary interactions and thus increasing the contaminant deposition probability. Additionally, the total fluid path shall be kept short in order to limit influences of the deposition trap 10 on the vacuum transducer (delay of pressure equilibrium between inlet side 81 and outlet side 82).

Figure 4A:
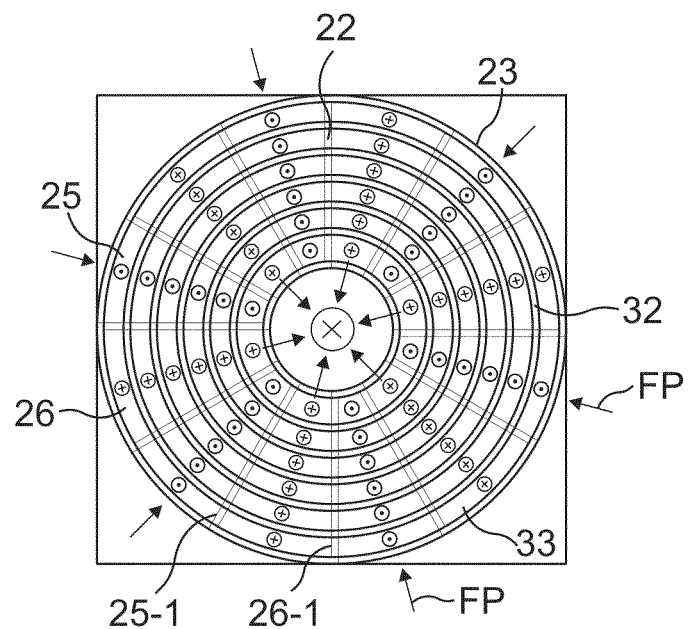
FIG. 4a is a partly transparent top view of the deposition trap of FIG. 1 showing the gas flow path from and into the microchannels.
Figure 4B:
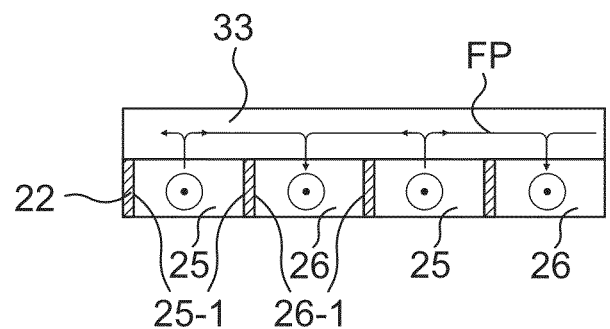
FIG. 4b is a radial cross-sectional view along a microchannel in accordance with a curved section line extending along a constant radius illustrating the gas flow path.

As shown in FIGS. 4a-b, the flow confinement is achieved by enforcing the flow path to pass through the microchannels 33. FIG. 4a shows a top view of the microchannel substrate 30 with the vertical fluid flow path (indicated by vector field notification: x means an arrow pointing downwards from/through the drawing plane, the point meaning an arrow pointing upwards from/through the drawing plane) from the manifold inlet channel 25 up into the microchannels 33 and down into the manifold outlet channel 26. FIG. 4b shows a corresponding radial cross-section along a microchannel 33. In order to transfer from a manifold inlet channel 25 to a manifold outlet channel 26 the flow must pass through the microchannel 33 and change direction four times.

The manifold substrate 20 enables a parallel fluid flow distribution inside the microchannels 33, which results in a very short fluid path and thus drastically reduces the pressure drop between inlet side 81 and outlet side 82. Therefore, the influence of the deposition trap on the dynamic pressure transmitter signal is small and a fast response time of the vacuum pressure transducer is achieved.

Figure 5A:
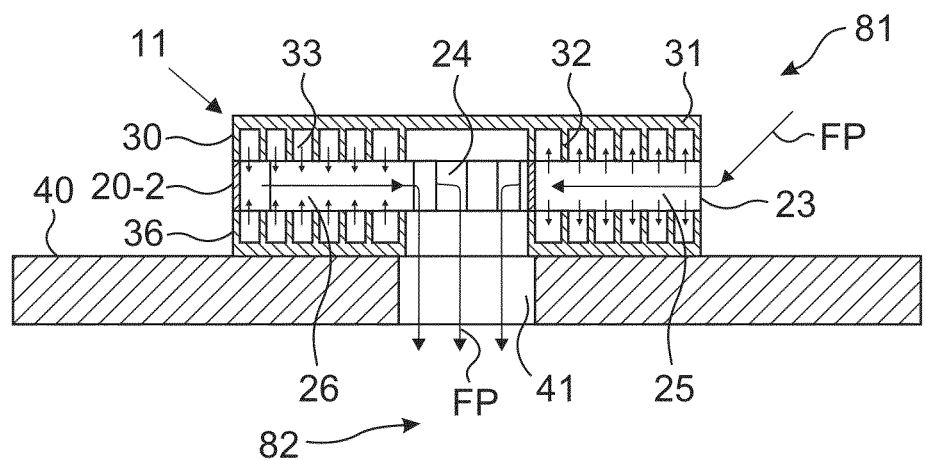
FIG. 5a is a cross-sectional view showing a triple substrate deposition trap with the corresponding gas flow path.

FIG. 5a illustrates an embodiment with a triple layer deposition trap 11 comprising a first microchannel substrate 30, a manifold layer 20-2 having no substrate base and a second microchannel substrate with feed-through 36. This embodiment adds additional parallel fluid transfer paths and further increases the vacuum pressure transducer 51 response time.

Figure 5B:
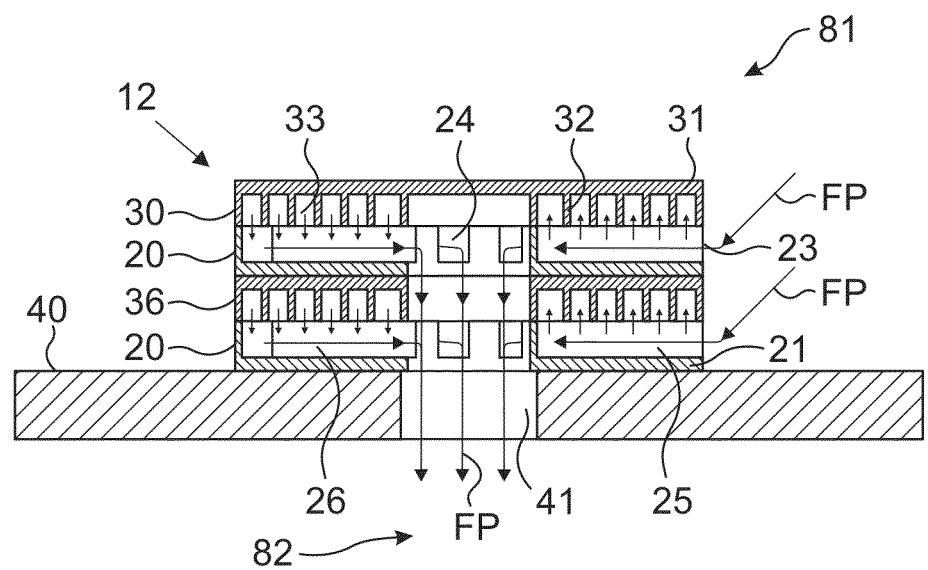
FIG. 5b is a cross-sectional view showing an embodiment with two stacked MEMS deposition traps and corresponding gas flow path.

FIG. 5b illustrates an embodiment with two stacked MEMS deposition traps 12. Similar as the triple substrate deposition stack 11, this embodiment increases (i.e. doubles) the parallel fluid transfer path and thus reduces the pressure loss between inlet side 81 and outlet side 82.

Figure 6A:
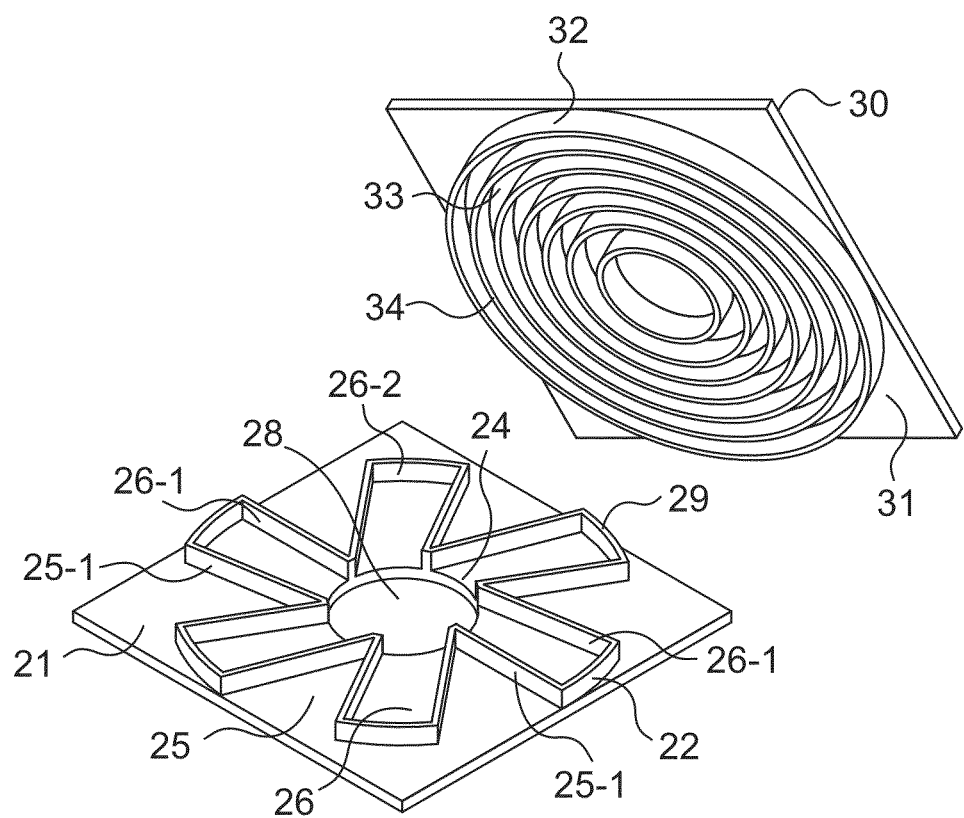
FIG. 6a shows an example of an asymmetric embodiment of the manifold and microchannel substrate.

FIG. 6a shows an example of a further embodiment of the present invention, where the manifold channel geometry is changed compared to that shown in FIGS. 1 and 2. Whereas the manifold side walls 25-1 and 26-1 in FIGS. 1 and 2 are basically directed in a radial direction, the side walls 25-1 and 26-1 in FIG. 6a are directed in a different manner, being at least partially inclined with respect to radial directions. The arrangement in accordance with FIG. 6a leads to substantially V-shape of the manifold inlet channels 25 and to a substantially polygonal U-shape of the manifold outlet channels 26. In this respect, one may describe the inlet and outlet channels 25 and 26 of FIG. 6a as being formed asymmetric. The manifold inlet channels 25 and the manifold outlet channels 26 have an optimized shape to reduce the pressure drop across the deposition trap.

Figure 6B:
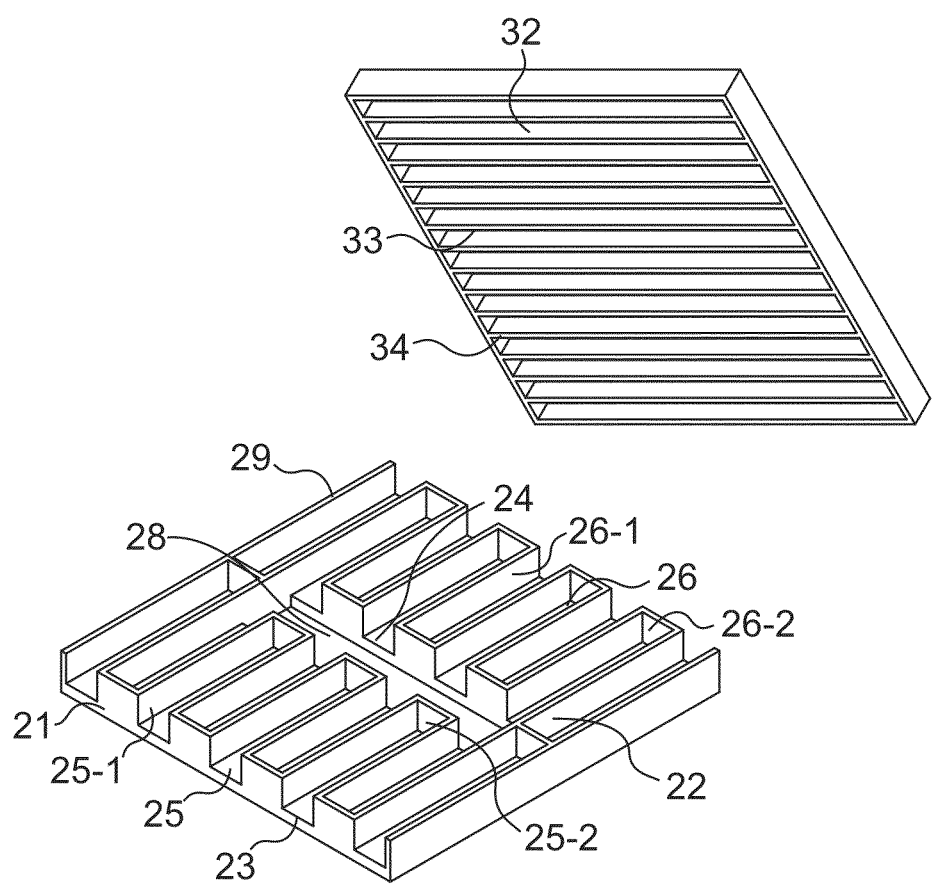
FIG. 6b shows an example of a rectangular embodiment of the manifold and microchannel substrate.

FIG. 6b shows an example of an embodiment with rectangular manifold and microchannel substrates. This arrangement allows for a regular channel distribution and thus a higher density of the active trap area per chip.

Figure 6C:
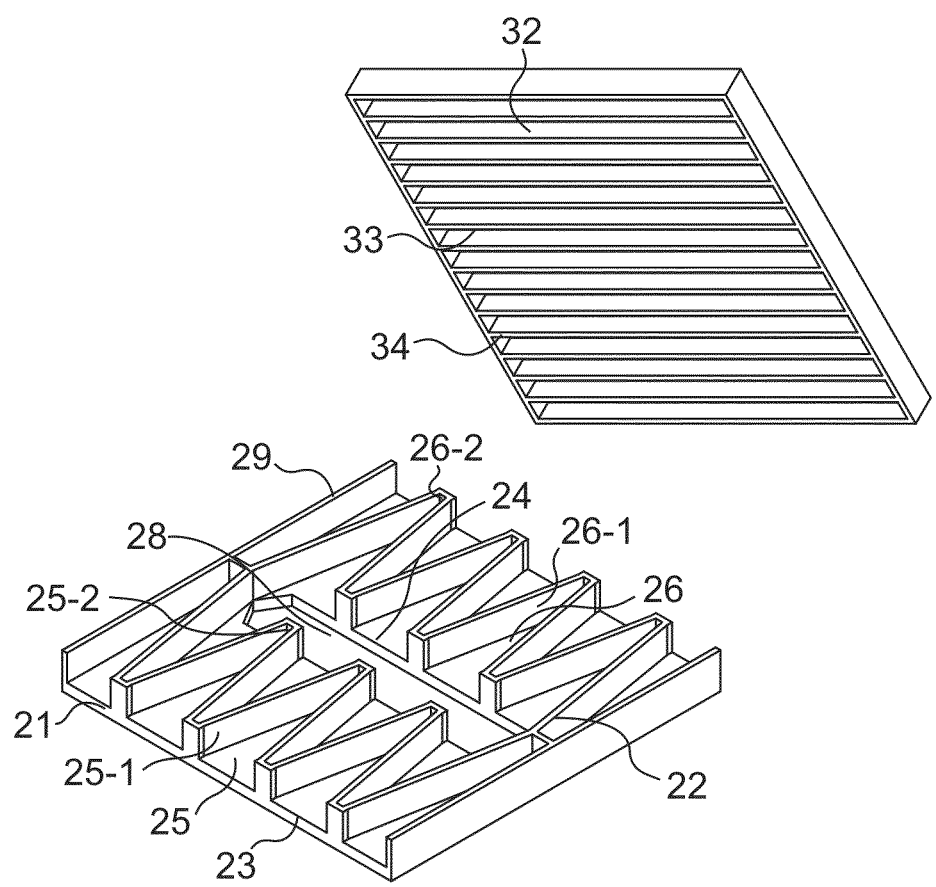
FIG. 6c shows an example of a rectangular embodiment of the manifold and microchannel substrate, where the manifold channels are tapered for optimized gas flow.

FIG. 6c shows a tapered rectangular version of the manifold inlet and outlet channels 25 and 26 optimizing the fluid flow and thus minimizing the pressure drop across the deposition trap 10.

It has to be noted that in FIGS. 6a to 6c the same reference numbers are used for similar parts even if they are not all described again. Such parts are the same as described for FIGS. 1 to 4 and have the same functionality.

Figure 7A:
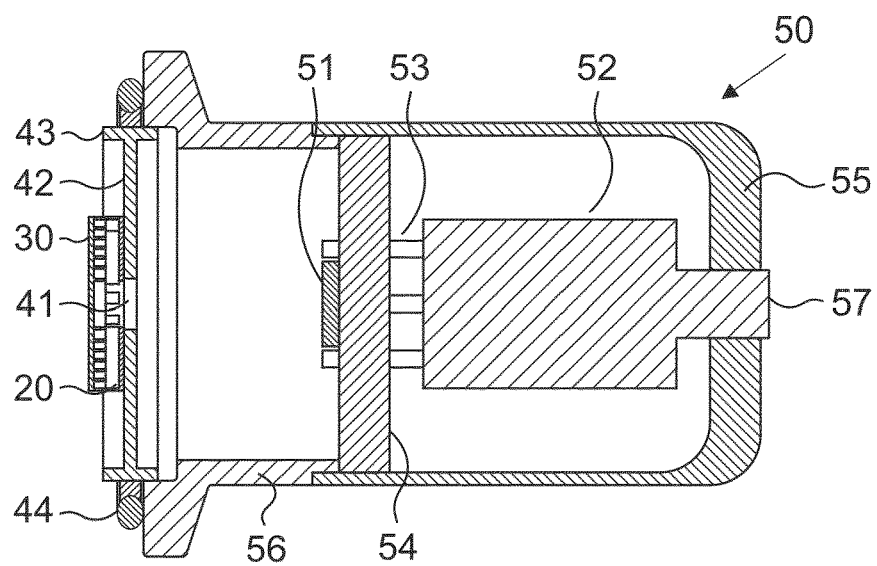
FIG. 7a is a cross-sectional view of a vacuum sensor assembly showing an embodiment of the deposition trap integrated into the flange with gasket.
Figure 7B:
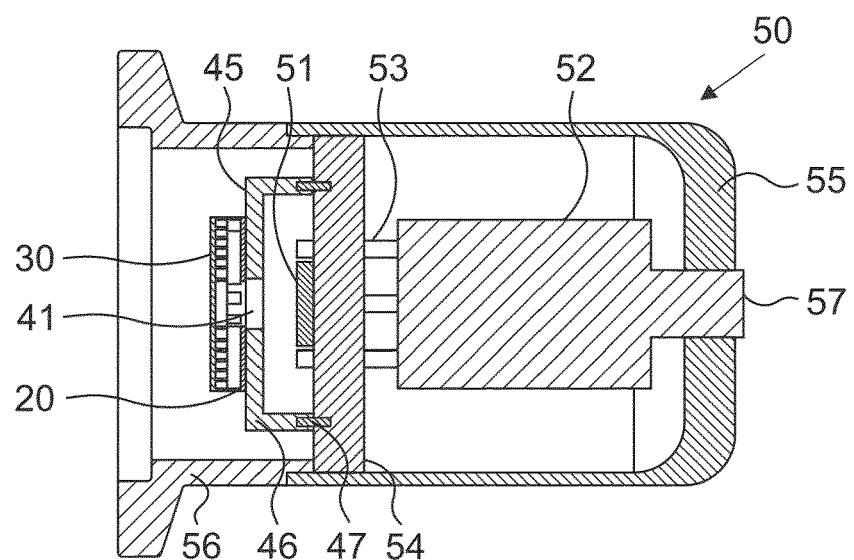
FIG. 7b is a cross-sectional view of a vacuum sensor assembly showing an embodiment of the deposition trap as a removable sensor cap.
Figure 7C:
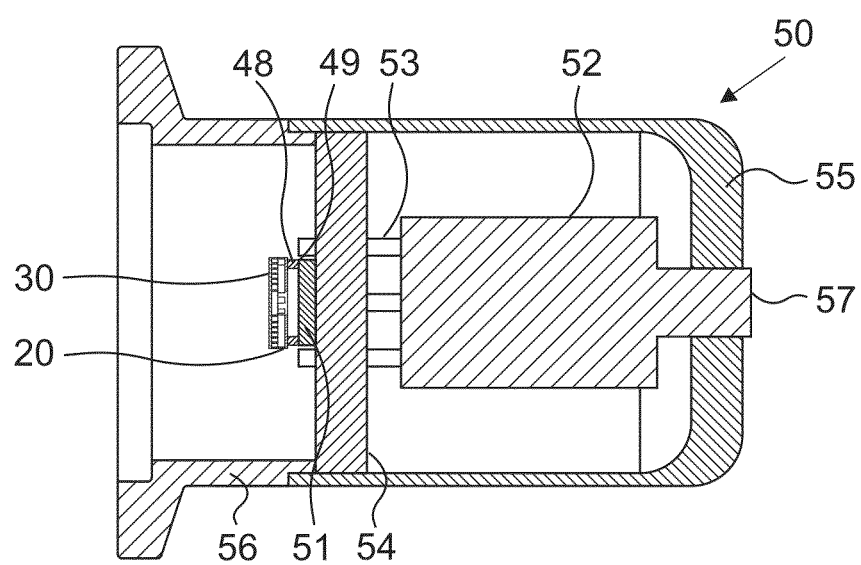
FIG. 7c is a cross-sectional view of a vacuum sensor assembly showing an embodiment of the deposition trap as a directly integrated package.

As shown in FIGS. 7a-c, the deposition trap can be integrated to a vacuum sensor 50 in different ways, as long as the trap is located between the fluid inlet port of a sensor fitting 56 and the vacuum pressure transducer 51 of the sensor. In general, but not limited to the description, a vacuum sensor assembly is composed of a vacuum pressure transducer 51, a circuitry 52, an electrical feed-through 53, a sealing back plate 54, a sensor housing 55, a sensor fitting 56 and an electrical interface 57.

Referring to FIG. 7a, one preferred embodiment of a vacuum sensor assembly is the integration of the deposition trap 10 into the support substrate 42 having a centering ring 43, a gasket 44 and a feed-through 41.

Referring to FIG. 7b, another preferred embodiment of a vacuum sensor assembly is the integration of the deposition trap 10 as a removable cap of the vacuum pressure transducer 51. In this embodiment the manifold substrate 20 and microchannel substrate 30 are integrated into a support substrate 45 having a sensor cap 46 and a feed-through 41. The sensor cap is attached by a sensor cap clamp 47.

Referring to FIG. 7c, a further preferred embodiment of a vacuum sensor assembly is the direct integration of the deposition trap 10 as a package of a vacuum pressure transducer 51. In this embodiment the manifold substrate 20 and microchannel substrate 30 are mounted directly on the vacuum pressure transducer 51 by means of a bond connection 49.

Figure 8A:
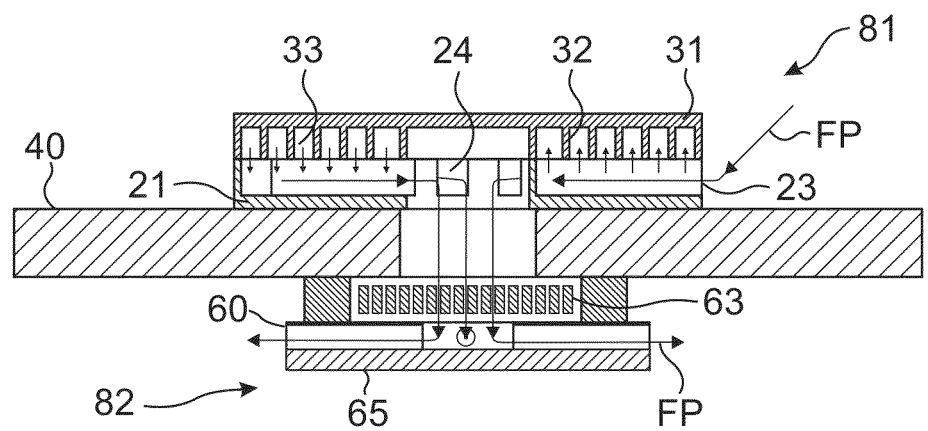
FIG. 8a shows a cross-sectional view of the deposition trap with additional electrostatic trap.
Figure 8B:
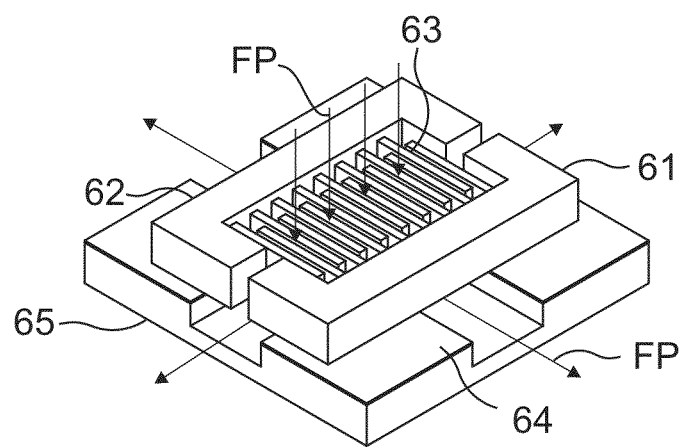
FIG. 8b is a perspective view of the electrostatic trap showing the gas flow path.

FIG. 8a shows a cross-sectional view of the deposition trap with additional electrostatic trap 60 mounted below the support feed-through 41 of the support substrate 40. FIG. 8b is a perspective view of the electrostatic trap showing the gas flow path. The trap has electrostatic combs 63 with positive electrodes 61 and negative electrodes 62 in order to generate an electric field across the latter two. The purpose of the electric field applied is to deflect charged contaminants to deposit on the electrostatic combs 63. The electrostatic comb 63 with electrodes is mounted on an electrode frame support 65 including an electrical isolation 64. The electrical isolation 64 makes sure there is no electrical connection between the positive electrodes 61 and the negative electrodes 62. The electrical isolation can be omitted, if the electrode frame support 65 is made out of an insulating material.

In order to introduce additional parallel fluid paths and thus further decrease the vacuum pressure transducer 51 response time, the manifold 20 and microchannel substrate 30 can include multiple entrance and exit channel sections as well as inlet 27 and outlet openings (feed-throughs) 28 arranged horizontally in an alternating manner.

Figure 9A:
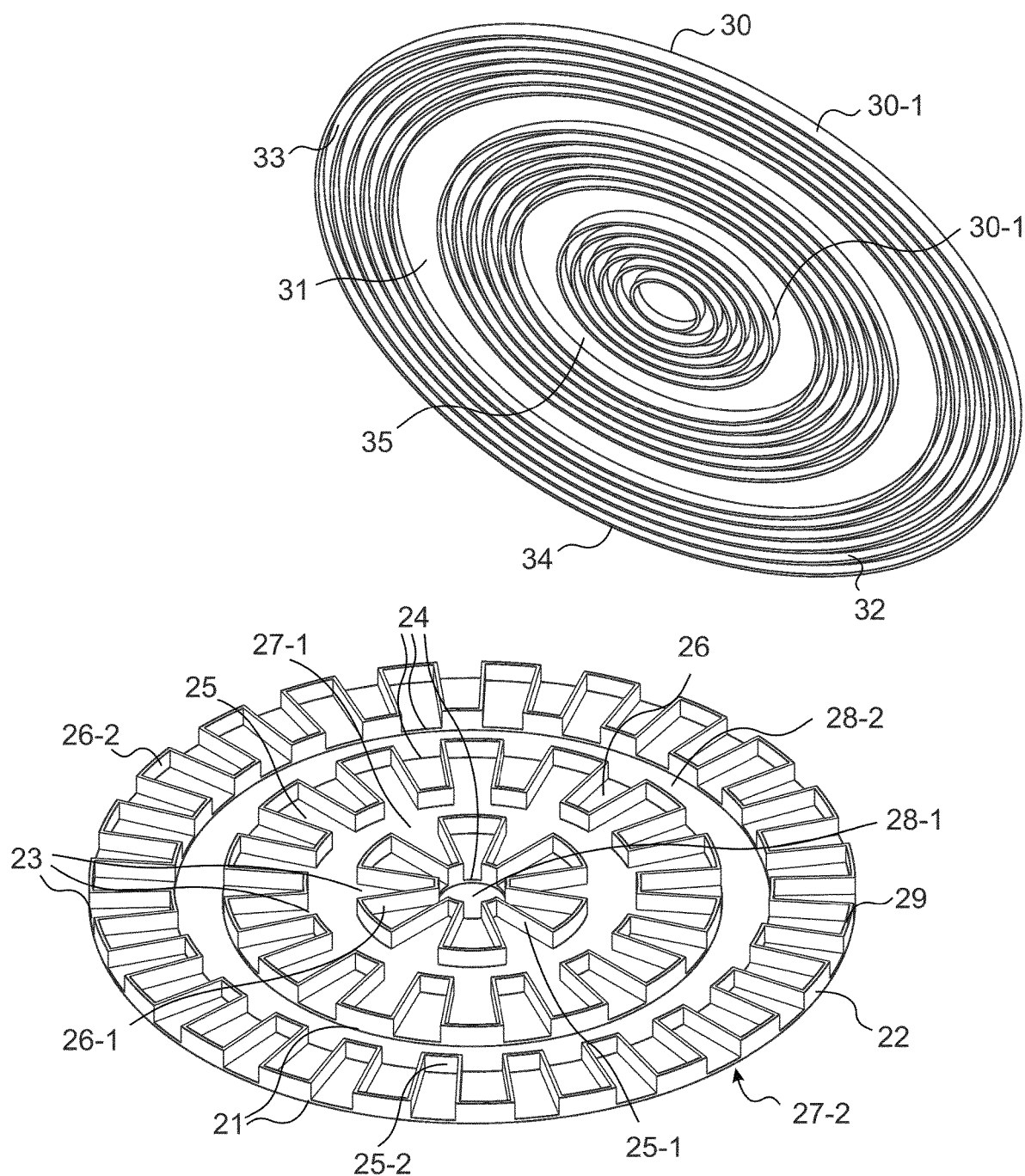
FIG. 9a shows an example of a circular embodiment of the manifold and microchannel substrate featuring multiple outlet and inlet openings.

FIG. 9a illustrates an example of a circular embodiment of the manifold 20 and microchannel substrate 30 featuring multiple inlet openings 27 and outlet openings 28, where the manifold channel 20-1 and microchannel portions 30-1 are arranged concentrically. A first outlet opening 28-1 is formed as a circle, wherein a second outlet opening 28-2 is formed as a ring. In this embodiment, a ring shaped feed-trough 35 is provided in the microchannel substrate leading to a manifold inlet opening 27-1. Furthermore, a second inlet opening 27-2 is arranged along the circumference of the MEMS deposition trap 10. Accordingly, in the assembled state of the MEMS deposition trap 10, the fluid may enter from the ring shaped inlet opening 27-1 as well as from the side inlet opening 27-2 and exit at both outlet openings 28-1 and 28-2. It is understood that, depending on the chosen design and structure, it is possible to arrange more than one ring shaped feed-through 35, preferably in a concentric manner.

Figure 9B:
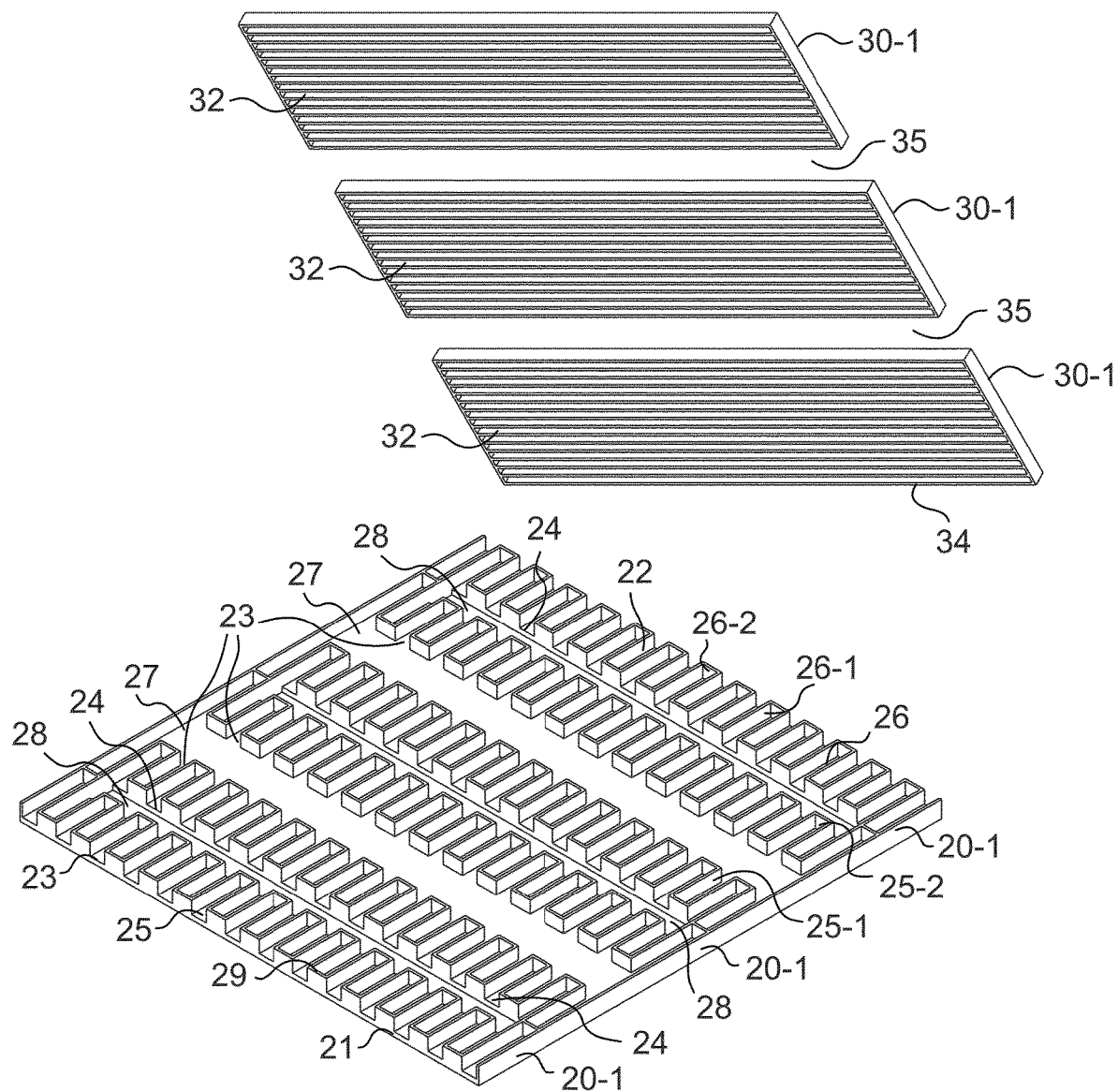
FIG. 9b shows an example of a rectangular embodiment of the manifold and microchannel substrate featuring multiple outlet and inlet openings.

In FIG. 9b, an example of a rectangular, parallel arranged system having multiple outlet openings 28 and inlet openings 27 is shown. The outlet openings 28 have a substantially rectangular shape and are arranged in parallel to each other. As there are multiple manifold portions 20-1 separated from each other, there are multiple manifold inlet openings 27 and thus multiple microchannel feed-throughs 35 arranged along each manifold portion 20-1.

In a further embodiment, the deposition trap 10 is cooled with respect to the environment in order to further improve the deposition of contaminants by condensation when interacting with the trap boundaries. The cooling is for instance achieved by a Peltier device and using the support substrate as heat sink.

Manufacturing Approach

According to the preferred embodiment, the deposition trap geometry is manufactured by means of silicon bulk micromachining. This fabrication technology is very well suited for manufacturing the deposition trap in a cost-effective large scale production. The manufacturing approach consists of preparing the manifold substrate 20 and microchannel substrates 30 by standard MEMS technology. After structuring the manifold channel walls 22 and the microchannel walls 32, the substrates are bonded together on wafer-level. For bonding, the microchannel substrate is flipped in a way that the microchannel bonding interface 34 is facing the manifold bonding interface 29 (compare FIG. 2). The stacking of two substrates allows manufacturing the main components required for the deposition trap functionality. Finally, the bonded substrates are singulated into individual deposition trap chips.

In another embodiment, the manufacturing is carried out using low temperature co-fired ceramic (LTCC) technology, where similar stacked structures can be fabricated in a cost-effective way.

LIST OF REFERENCE SIGNS

10 MEMS deposition trap
11 Triple substrate deposition trap
12 Multiple stack MEMS deposition trap
20 Manifold layer or substrate
20-1 Manifold layer portion
20-2 Manifold substrate w/o base
21 Manifold base
22 Manifold channel walls
23 Manifold entrance
24 Manifold exit
25 Manifold inlet channel
25-1 Inlet channel side wall
25-2 Inlet channel end wall
26 Manifold outlet channel
26-1 Outlet channel side wall
26-2 Outlet channel end wall
27 Manifold inlet opening
27-1 Inlet opening
27-2 Inlet opening
28 Manifold outlet opening (feed-through)
28-1 Outlet opening
28-2 Outlet opening 29 Manifold bonding interface
30 Microchannel layer or substrate
30-1 Microchannel layer portion
31 Microchannel base
32 Microchannel walls
33 Microchannels
34 Microchannel bonding interface
35 Microchannel feed-through
36 Microchannel substrate with feed-through
40 Support substrate
41 Support feed-through
42 Support substrate—Version: Flange with gasket
43 Centering ring
44 Gasket
45 Support substrate—Version: Sensor cap
46 Sensor cap
47 Sensor cap clamp
48 Support substrate—Version: MEMS direct integration
49 Bond connection
50 Vacuum sensor
51 Vacuum pressure transducer
52 Circuitry
53 Electrical feed-through
54 Sealing back plate
55 Sensor housing
56 Sensor fitting
57 Electrical interface
60 Electrostatic trap
61 Positive electrodes
62 Negative electrodes
63 Electrostatic combs
64 Electrical isolation
65 Electrode frame support
81 Side facing process chamber
82 Side facing vacuum transducer

The invention claimed is:

1. A deposition trap, comprising:
a manifold comprising:
   a first layer having manifold inlet channels and manifold outlet channels; and
   a second layer having channels connecting the manifold inlet channels to the manifold outlet channels,
wherein the first layer and the second layer are bonded together so as to form fluid paths between the manifold inlet channels and the manifold outlet channels,
wherein the fluid paths are configured such that a fluid is forced to pass through the channels of the second layer when flowing from the manifold inlet channels to the manifold outlet channels,
wherein a first manifold inlet channel is formed by two inlet side walls and an inlet end wall connecting the inlet side walls,
wherein the inlet side walls are arranged to form an opening at an inlet side of the deposition trap.

2. The deposition trap of claim 1, wherein the first layer is interposed between two second layers.

3. The deposition trap of claim 1, wherein a plurality of first layers and a plurality of second layers are stacked alternately to form the manifold.

4. The deposition trap of claim 1, wherein a first manifold outlet channel is formed by two outlet side walls and an outlet end wall connecting the outlet side walls, and wherein the outlet side walls are arranged to form an opening at an outlet side of the deposition trap.

5. The deposition trap of claim 1, wherein the manifold outlet channels are connected to at least one collecting outlet opening of the deposition trap.

6. The deposition trap of claim 5, wherein the manifold inlet channels, the manifold outlet channels, and the channels of the second layer are formed such that the fluid is forced to change flow direction multiple times when propagating from the manifold inlet channels to the at least one collecting outlet opening.

7. The deposition trap of claim 1, further comprising at least one inlet opening connected to at least a part of the manifold inlet channels.

8. The deposition trap of claim 1, wherein at least one of the first layer and the second layer is formed as a respective substrate, and wherein the respective substrate has a base connected to the manifold inlet channels or the manifold inlet channels and the channels of the second layer, respectively.

9. The deposition trap of claim 1, wherein the deposition trap further comprises a support substrate configured to be connected with an associated part of a vacuum sensor, and wherein the first layer is mounted on the support substrate.

10. The deposition trap of claim 9, wherein an electrostatic trap is mounted to the support substrate.

11. The deposition trap of claim 1, wherein the first layer and the second layer are manufactured by silicon bulk micromachining technology.

12. The deposition trap of claim 1, wherein the first layer and the second layer are manufactured by low temperature co-fired ceramic (LTCC) technology.

13. The deposition trap of claim 1, further comprising a Peltier cooling element configured to cool the deposition trap.

* * * * *